United States Patent
Davies (10) Patent No.: US 7,472,594 B1
(45) Date of Patent: Jan. 6, 2009

(54) FLUID LEVEL INDICATION SYSTEM AND TECHNIQUE

(75) Inventor: Dylan H. Davies, Stroud (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/767,576

(22) Filed: Jun. 25, 2007

(51) Int. Cl.
*G01F 23/00* (2006.01)

(52) U.S. Cl. .................. 73/295; 73/152.01; 73/152.12; 73/152.13; 73/152.41; 356/73.1

(58) Field of Classification Search ............... 295/295, 295/61.46, 152.01, 152.12, 152.13, 152.41; 356/73.1; 702/13

See application file for complete search history.

(56) References Cited

U.S. PATENT DOCUMENTS

| | | | | |
|---|---|---|---|---|
| 5,582,064 A * | 12/1996 | Kluth | ................. | 73/1.57 |
| 6,380,534 B1 | 4/2002 | Farhadiroushan et al. | | |
| 6,618,677 B1 * | 9/2003 | Brown | ................. | 702/13 |
| 6,807,324 B2 | 10/2004 | Pruett | | |
| 6,920,395 B2 | 7/2005 | Brown | | |
| 6,983,796 B2 * | 1/2006 | Bayne et al. | ................. | 166/278 |
| 7,000,696 B2 | 2/2006 | Harkins | | |
| 7,126,680 B2 | 10/2006 | Yamate | | |
| 7,215,416 B2 | 5/2007 | Yamate | | |
| 2003/0219190 A1 * | 11/2003 | Pruett | ................. | 385/12 |
| 2004/0134662 A1 * | 7/2004 | Chitwood et al. | ................. | 166/367 |
| 2006/0191683 A1 * | 8/2006 | Fukuhara et al. | ................. | 166/250.01 |
| 2006/0191684 A1 * | 8/2006 | Smith, Jr. | ................. | 166/250.1 |
| 2006/0245469 A1 * | 11/2006 | Koeniger | ................. | 374/208 |
| 2007/0110355 A1 * | 5/2007 | Jaaskelainen et al. | ................. | 385/12 |
| 2007/0234788 A1 * | 10/2007 | Glasbergen et al. | ................. | 73/152.12 |

FOREIGN PATENT DOCUMENTS

| | | |
|---|---|---|
| EP | 1196743 | 9/2003 |
| EP | 1515128 | 3/2005 |
| GB | 2397648 | 7/2004 |
| GB | 2416871 | 2/2006 |
| WO | 2005064297 | 7/2005 |

* cited by examiner

*Primary Examiner*—Gunnar J. Gissel
(74) *Attorney, Agent, or Firm*—Daryl R. Wright; Trop, Pruner & Hu, P.C.; James L. Kurka (57) ABSTRACT

A technique that is usable with a well includes disposing a distributed temperature sensor in a conduit that traverses a region of the well. The region contains at least two different well fluid layers. The technique includes circulating a fluid through the conduit and using the distributed temperature sensor to observe at least one temperature versus depth profile of the fluid. Based on the observation, the depth of a boundary of at least one of the well fluid layers is determined.

24 Claims, 8 Drawing Sheets

FLUID LEVEL INDICATION SYSTEM AND TECHNIQUE

BACKGROUND

The invention generally relates to a fluid level indication system and technique.

In oil fields it is typically important to know the levels of the fluids in the reservoir and around wells, and in particular, it may be important to know the depths of the interfaces between the gas, oil and water layers. Such knowledge is particularly important in secondary and tertiary recovery systems, for example, in steam flooding applications in heavy oil reservoirs.

Traditionally, the depths of the interfaces between the fluid levels are determined using pressure measurements. For example, one approach involves using a single pressure sensor, which makes a series of pressure measurements at multiple depths. The measured pressure is plotted against the depth. In each of the gas, oil and water layers, the pressure gradient is constant and proportional to the density of the fluid. The depths of the fluid layer interfaces, or boundaries, are identified by the intersections of the pressure gradient lines. The above-described technique of identifying the interface depths using a pressure sensor typically works well when carried out in an intervention in the well using, for example, a wireline-deployed tool.

For purposes of permanently monitoring the depths of the fluid interfaces, an array of pressure sensors may be placed across the gas, oil and water layers. In this regard, the pressure gradients may be plotted and the analysis that is set forth above may be applied. If the depths of the interfaces change over time, a large number of pressure sensors may be required to accurately assess the interface depths. A large number of pressure sensors may also be required if the initial positions of the interfaces are unknown or uncertain. However, several challenges may arise with the use of a large number of pressure sensors, such as challenges related to compensating the pressure readings for sensor offset and drift. Furthermore, the cost of an array of pressure sensors can be high and prohibitive.

Downhole distributed temperature sensing (DTS) involves the use of a sensor that indicates a temperature versus depth distribution in the downhole environment. DTS typically is used to identify and quantify production from different injection/production zones of a well.

For example, in a technique called "hot slug tracking," DTS may be used to identify the permeable zones in a water injector well where injected fluid enters the formation. The permeable zones typically cannot be identified by DTS during normal injection. However, by shutting off injection and allowing the water in the tubing or casing above the injection zone to be heated up towards the geothermal gradient, a heated "slug" may be created. When the injection is re-started, the hot slug may be tracked versus time using the DTS measurements to identify the permeable zones.

SUMMARY

In an embodiment of the invention, a technique that is usable with a well includes disposing a distributed temperature sensor in a conduit that traverses a region of the well. The region contains at least two different well fluid layers. The technique includes circulating a fluid through the conduit and using the distributed temperature sensor to observe at least one a temperature versus depth profile of the fluid. Based on the observation, the depth of a boundary of at least one of the well fluid layers is determined.

In another embodiment of the invention, a system that is usable with a well includes a distributed temperature sensor subsystem, a tubing and a pump. A distributed temperature sensor of the distributed temperature sensor subsystem is disposed in the tubing, and the tubing traverses a region of the well, which contains at least two different well fluid layers. The pump circulates a fluid through the tubing; and the distributed temperature subsystem observes at least one temperature versus depth profile of the fluid such that said at least one temperature versus depth profile indicates the depth of a boundary of at least one of the well fluid layers.

In yet another embodiment of the invention, a system includes a tubing, a pump and a subsystem. The tubing traverses a region of a container, which contains at least two different fluid layers, and a distributed temperature subsystem is disposed in the tubing. The pump circulates a fluid through the tubing, and the subsystem observes a temperature versus depth profile of the fluid such that the temperature versus depth profile indicates a characteristic associated with at least one of the fluid layers.

Advantages and other features of the invention will become apparent from the following drawing, description and claims.

DETAILED DESCRIPTION

In accordance with embodiments of the invention described herein, the depths of different well fluid layer interfaces (interfaces between oil, gas and water layers, as examples) are determined using one or more distributed temperature sensing (DTS) measurements. Each DTS measurement reveals a temperature versus depth distribution, or profile, of a fluid that is contained in a conduit (pipe, tubing, or control line, as just a few examples of a "conduit") that traverses the well fluid layers of interest. The temperature versus depth profile, in turn, indicates the interface depths.

As set forth by way of specific examples herein, the DTS measurements may be conducted in connection with two different types of tests: 1.) a first test (called a "relaxation test" herein) in which the measured temperature versus depth profile is used to observe the fluid's temperature relaxation after circulation of the fluid in the conduit has been halted; and 2.) a second test (called a "steady state test" herein) in which the temperature versus depth profile is used to observe the fluid's steady state temperature while the fluid is being continuously circulated in the conduit. The relaxation temperature versus depth profile and the steady state temperature versus depth profile each reveals the locations (i.e., depths) of the well fluid interfaces, as further described below.

Figure 1:
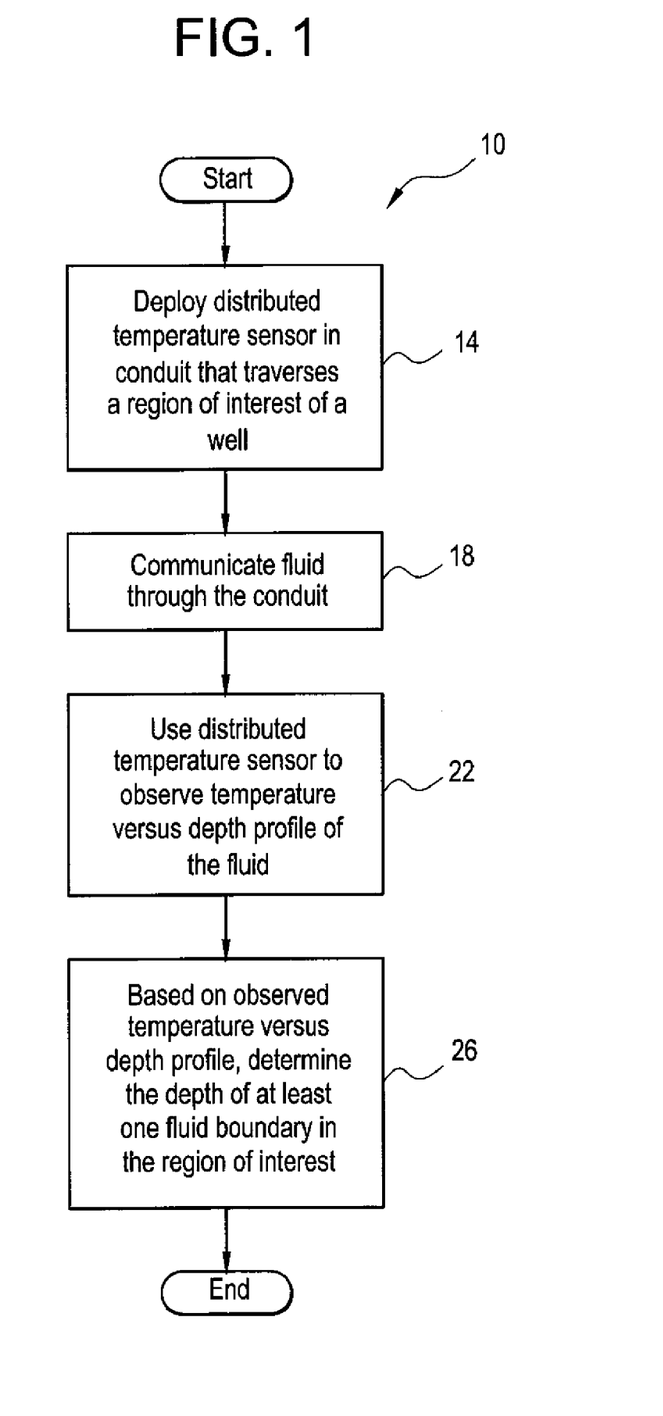
FIG. 1 is a flow diagram generally depicting a technique to use a distributed temperature sensor to identify a characteristic of at least one well fluid layer according to an embodiment of the invention.

To generalize, FIG. 1 depicts a technique 10 that may be used in accordance with embodiments of the invention. Pursuant to the technique 10, a distributed temperature sensor is deployed (block 14) in a conduit that traverses a region of interest of a well, and fluid is communicated through the conduit, as depicted in block 18. The distributed temperature sensor is used to observe (block 22) the temperature versus depth profile of the fluid; and based on the observed temperature profile, the depth of at least one well fluid layer boundary in the region of interest may be identified, pursuant to block 26.

Figure 2:
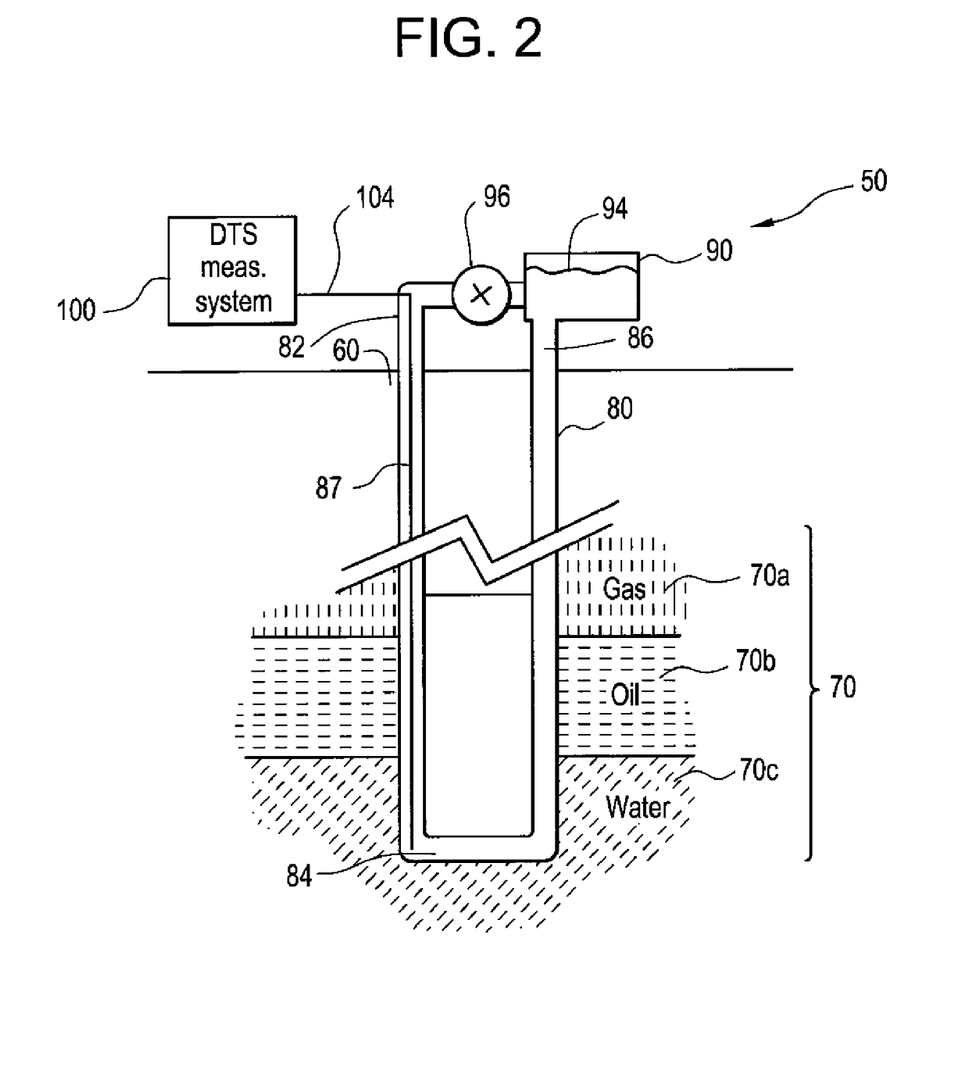
FIG. 2 is a schematic diagram of a well according to an embodiment of the invention.

FIG. 2 depicts an exemplary well 50, which uses a DTS-based system 100 (Sensa's DTS-800 system, for example) in accordance with embodiments of the invention. For purposes of obtaining a temperature versus depth profile, the well 50 includes a downhole DTS subsystem, which includes a distributed temperature sensor 87 (an optical fiber, for example) that is disposed in a conduit 80 (a control line, as an example). In accordance with some embodiments of the invention, the distributed temperature sensor 87 may be placed inside a small control line (not depicted in FIG. 2), which extends downhole inside the conduit 80. In this regard, the small control line may be filled with an inert gas (nitrogen, for example) or fluid (silicone oil, for example) for purposes of protecting the distributed temperature sensor 87. More specifically, if the distributed temperature sensor 87 is an optical fiber, the fiber when placed in a fluid, such as water, may degrade relatively quickly. Therefore, by disposing the optical fiber inside a small control line that extends inside the conduit 80 and filling this conduit with the inert gas, the lifetime of the optical fiber is extended.

The conduit 80 extends downhole in a wellbore 60 and traverses a region of the well 50, which contains various fluid layers 70 such as exemplary gas 70a, oil 70b and water 70c layers. As shown in FIG. 2, the conduit 80 is U-shaped in that the fluid flows through the conduit 80 downhole into the well 50 and returns uphole to the well surface. More specifically, the conduit 80 receives (at an inlet 82) a fluid flow, which is produced by a surface pump 96. The fluid flows from the inlet 82, through the fluid layers 70 and passes through a U-shaped bottom 84 of the conduit 80. At this point the fluid returns to the surface of the well 50 and thus, passes through the layers 70 back to an outlet 86 of the conduit 80, which is located at the surface of the well. At the surface, the fluid enters a reservoir 94, and from the reservoir 94 the fluid returns via the pump 96 back into the well 50.

Thus, the conduit 80 forms a loop for circulating a fluid through the well fluid layers 70. Depending on the particular embodiment of the invention, the fluid in the conduit 80 may be water, toluene or hydraulic oil, as just a few examples.

In accordance with some embodiments of the invention, the sensor 87 may be retrievable from the well 50. For example, in embodiments of the invention, in which the sensor 87 is an optical fiber, the fiber may be pumped into position in the conduit 80. The overall physical condition of the optical fiber may potentially degrade over time. Therefore, it may become desirable to remove the optical fiber from the conduit 80 (by pumping) and pump a replacement optical fiber into the conduit 80.

It is noted that the well 50 is merely an example of one out of many different types of wells that may use the techniques and systems that are described herein. In this regard, although FIG. 2 depicts a vertical wellbore 60, it is understood that the systems and techniques that are described herein may be applied to deviated, lateral, or horizontal wellbore sections. Additionally, the wellbore 60 may be cased or uncased, depending on the particular embodiment of the invention. Furthermore, the well 50 may be a subterranean or subsea well, depending on the particular embodiment of the invention. Thus, many variations are contemplated, all of which fall within the scope of the appended claims.

The distributed temperature sensor 87 may be disposed in the downstream flowing portion of the conduit (as depicted in FIG. 2) or the upstream flowing portion of the conduit 80, depending on the particular embodiment of the invention. As another variation, in accordance with some embodiments of the invention, the distributed temperature sensor 87 of FIG. 2 may be installed in a double-ended configuration, in which the sensor 87 extends in a U configuration from the inlet 82 to the outlet 86 of the conduit 80. The distributed temperature sensor 87 may be deployed with the conduit 80 (and thus, may be installed downhole with the conduit 80) or may be subsequently pumped into the conduit 80 after the conduit 80 is installed downhole, depending on the particular embodiment of the invention. For embodiments of the invention in which the distributed temperature sensor 87 is an optical fiber, the sensor 87 may be optically coupled to a DTS measurement system 100, which may be located at the surface of the well 50.

By activating the pump 96, the temperature profile of the fluid in the loop (i.e., in the conduit 80) can be changed, as fluid from a region at one temperature is pumped to a region at a different temperature. When pumping ceases, the temperature of the fluid relaxes to the new local temperature. Since the efficiency of heat transfer is different for different fluids, the relaxation rates will differ from zone to zone. The distributed temperature profile will change with time and will have distinct regions that are separated by boundaries. These boundaries are located at the depths of the interfaces between the different fluids in the well.

Figure 3:
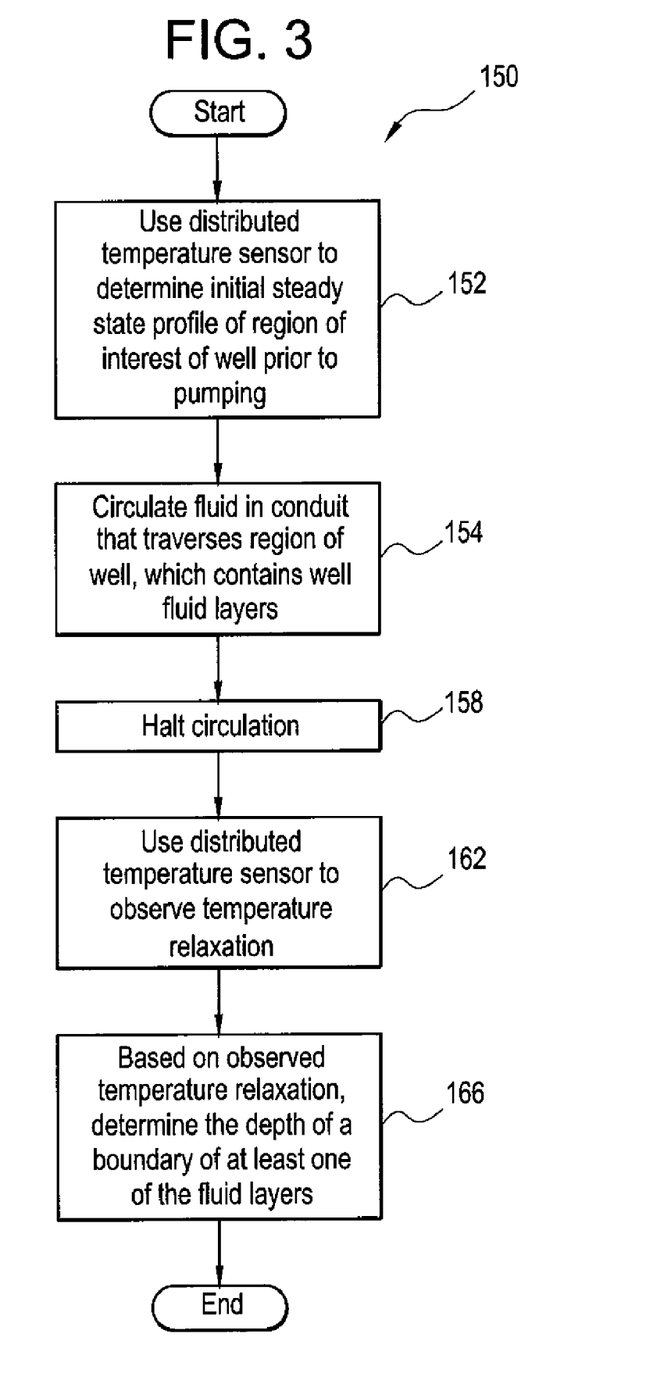
FIG. 3 is a flow diagram depicting a technique to identify a characteristic of at least one well fluid layer based on temperature relaxation according to an embodiment of the invention.

As a more specific example, FIG. 3 depicts a technique 150, which is an example of the relaxation test, in accordance with some embodiments of the invention. Pursuant to the technique 150, a distributed temperature sensor is used (block 152) to determine an initial steady state profile of region of interest prior to circulation of fluid. The fluid is circulated (block 154) in a conduit (e.g., the conduit 80 of FIG. 2), which traverses a region of the well that contains well fluid layers. Circulation of the fluid is then halted (block 158), e.g., the pump 96 is momentarily turned off. At this point, the temperature versus depth profile (as indicated by the DTS system) undergoes a temperature relaxation, in that the local temperature of the fluid in the conduit varies with the thermal properties (thermal capacity and thermal conductivity) of the surrounding environment.

Figure 4:
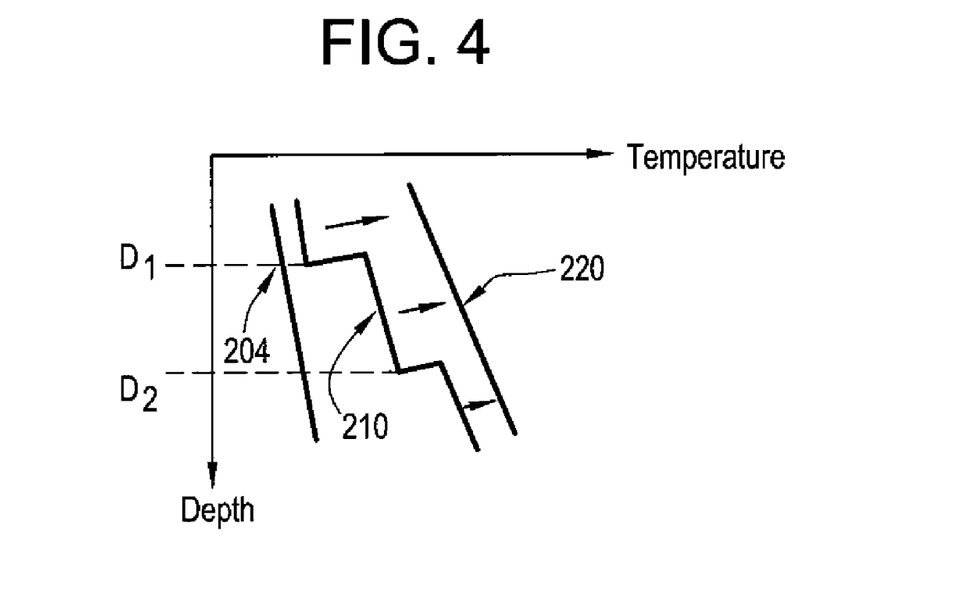
FIGS. 4 and 5 are illustrations of temperature versus depth profiles obtained by the distributed temperature sensor at different times according to different embodiments of the invention.

More specifically, FIG. 4 depicts an illustration 200 of three exemplary temperature versus depth profiles 204, 210 and 220, which are associated with different stages of the relaxation test. Prior to the pumping of fluid, the temperature versus depth profile is similar to the profile 220. While the fluid circulates in the conduit 80 (FIG. 2) at a sufficiently fast rate, the temperature versus depth profile resembles the exemplary profile 204, which is generally linear. After the pump is turned off, the relatively cool fluid is heated by the surrounding fluid layers, thereby changing the temperature versus depth profile, as the local temperatures rise. Because the well fluid layers 70 have different thermal conductivities and capacities, the rate of warming is locally different in the different layers 70 during the warming, or relaxation period, as illustrated by exemplary profile 210.

Due to the differences in the thermal properties, the profile 210 is discontinuous at each well fluid layer interface. Thus, the boundary between the upper gas layer 70a and the middle oil layer 70b, according to the temperature profile 210, occurs at depth $D_1$; and the interface between the middle oil layer 70b and the lower water layer 70c occurs at a depth $D_2$. The arrows adjacent the profile 210 indicate the direction that the profile 210 moves over time.

Eventually, the transient effects, which are present during the relaxation period pass so that the fluid in the loop warms up to the temperature of the surrounding fluid. At this point, the temperature versus depth profile resembles the exemplary profile 220, which is generally linear throughout all of the well fluid layers 70 and represents the geothermal gradient (unless secondary tertiary recovery schemes such as steam flooding is used in which case the profile is not linear). When thermal equilibrium around the loop has been established, the above-described process may be repeated. Several relaxation temperature versus depth profiles may be stacked for purposes of improving the overall signal-to-noise ratio. The stacking of successive relaxation profiles is valid because the fluid levels in a well may vary relatively slowly with time.

Many variations are contemplated and are within the scope of the appended claims. For example, in accordance with other embodiments of the invention, the well may not have a reservoir at the surface for purposes of storing the fluid that is circulated through the conduit 80. In this regard, instead of pumping relatively colder fluid from the surface of the well, relatively warmer fluid may be pumped through the loop across the reservoir. The warmer fluid may also be supplied, for example, by a surface heating system or from a downhole pump. Thus, with circulation of the fluid through the loop being halted, the local temperature of the fluid cools (instead of being heated) as a function of the thermal conductivities and capacities of the surrounding fluid layers.

Figure 5:
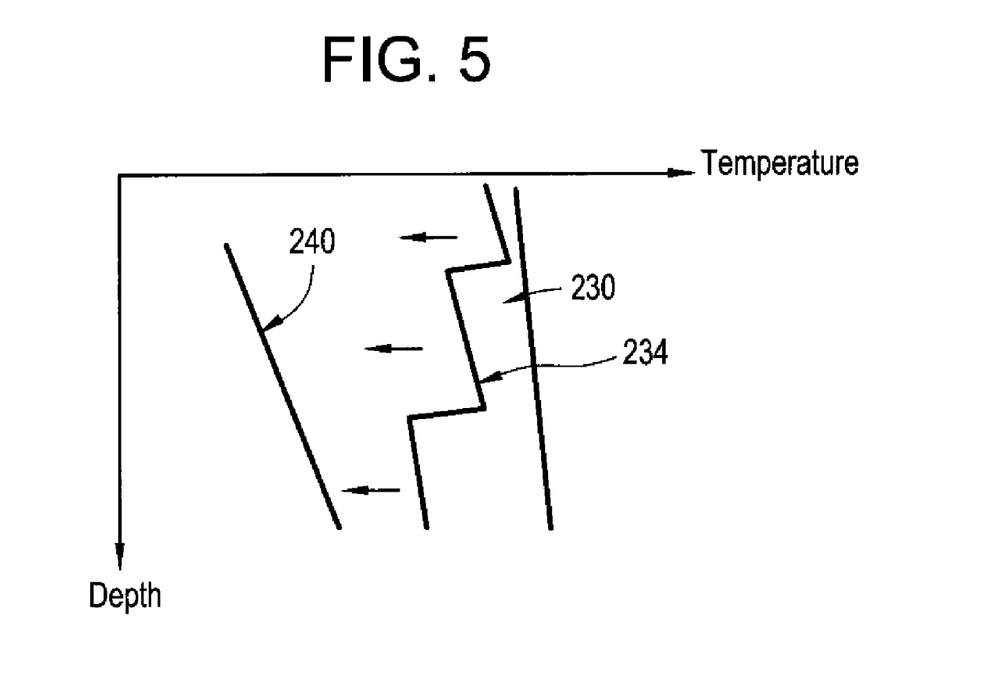

As a more specific example, FIG. 5 depicts an illustration 229 of exemplary temperature versus depth profiles 230, 234 and 240, which are associated with the fluid circulation, no fluid flow and end of relaxation stages, respectively, when the warmer fluid is circulated, in accordance with some embodiments of the invention. As shown, when the pumping first ceases, the temperature versus depth profile resembles the exemplary generally linear profile 230. During the relaxation, the localized fluid temperature is a function of the thermal properties of the local environment; and as such, the temperature versus depth profile resembles the exemplary profile 234, which has discontinuities that identify the well fluid interfaces. Eventually at the end of the relaxation, the temperature versus depth profile transitions to the exemplary profile 240, which is generally linear.

It is noted that the systems that are described herein may be used in applications in which steam is pumped into the reservoir to reduce the viscosity of the oil. In this case, the initial temperature versus depth profile may not be linear but instead may exhibit an increase in temperature higher up in the well. Nevertheless, a change in temperature on pumping the fluid and a relaxation to the initial profile are still revealed. Irrespective of the initial profile, the local rate of relaxation is dependent on the thermal properties of the well fluid at the particular depth.

The relaxation of the local temperature measured by DTS depends on the local thermal conductivity (k) and the specific heat capacity (cp) of the material surrounding the pipe in which the sensor is contained. Faster relaxation occurs with higher thermal conductivity and higher specific heat capacity of the surrounding material; and therefore, in an approximation, the relaxation time decreases with their product (k*cp). Table 1 depicts typical values of thermal conductivity (k), specific heat capacity (cp) and their product (k*cp) for water, typical oil, methane, steam and air.

TABLE 1

|  | Water | Oil | Methane | Steam | Air |
|---|---|---|---|---|---|
| Specific Heat capacity (cp) J.g-1.K-1 | 4.18 | 1.6-2.4 | 2.2-2.8 | 2 | 1.01 |
| Average cp J.g-1.K-1 | 4.18 | 2 | 2.5 | 2 | 1.01 |
| Thermal Conductivity (k) W.K-1.m-1 | 0.55-0.67 | 0.15 | 0.03 | 0.016 | 0.024 |
| Average k W.K-1.m-1 | 0.61 | 0.15 | 0.03 | 0.016 | 0.024 |
| Product (average cp)*(average k) | 2.55 | 0.3 | 0.075 | 0.032 | 0.024 |

The product k*cp is approximately an order of magnitude higher for water than for oil, which in turn is almost an order of magnitude higher than for any of the gases (methane, steam, air). This indicates that the location of the oil/water and gas/oil fluid interfaces in a well may be identified by changes or discontinuities in relaxation of the temperature versus depth profile after pumping hotter or colder fluid across the reservoir.

Figure 6:
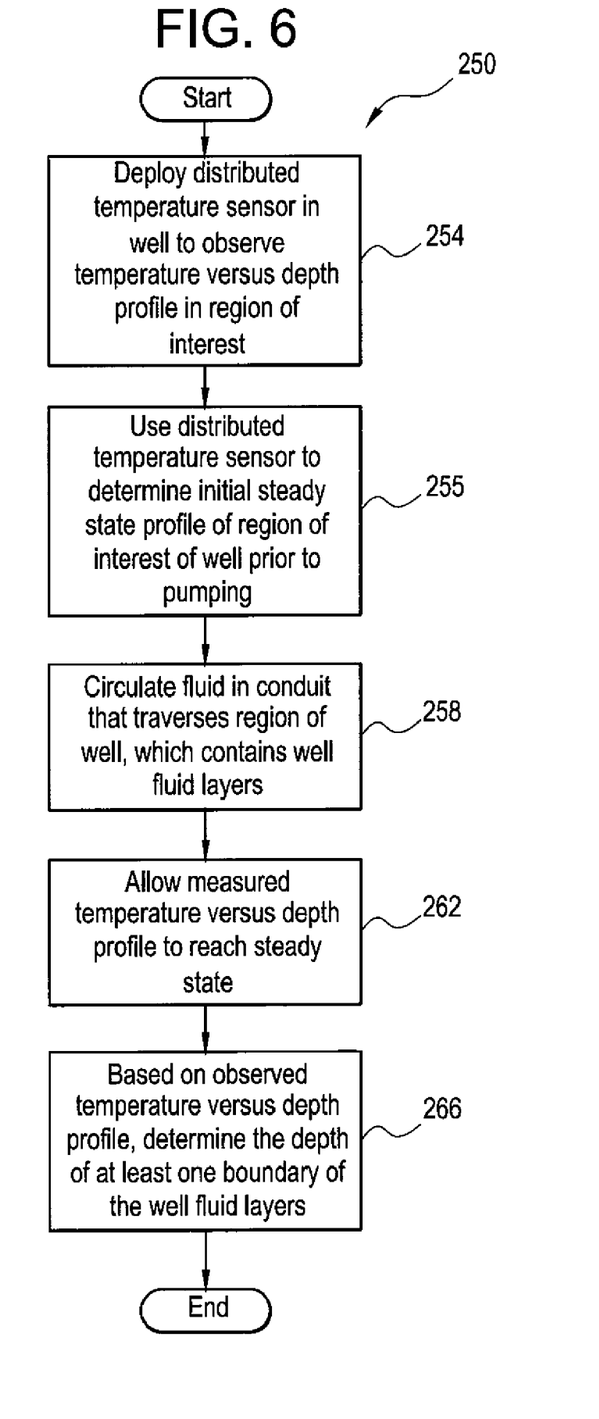
FIG. 6 is a flow diagram depicting a technique to use a distributed temperature sensor to identify a depth of a boundary of at least one well fluid layer using a steady state temperature measurement technique according to an embodiment of the invention.

FIG. 6 depicts a steady state technique 250 in accordance with an embodiment of the invention and may be used as an alternative to the relaxation test or may be used in conjunction with the relaxation test, as further described below. Unlike the relaxation test, the steady state test involves taking a DTS measurement while the fluid is circulating in the conduit 80. The rate at which the fluid is being circulated in the conduit 80 (FIG. 2) is such that the observed temperature versus depth profile contains discontinuities at the well fluid interfaces. More specifically, pursuant to the technique 250, a distributed temperature sensor is deployed (block 254) in a well to observe a temperature versus depth profile in a region of interest. A distributed temperature sensor is used (block 255) to determine an initial steady state profile prior to the circulation of a fluid in the conduit that contains the sensor. The fluid is then circulated through a conduit that traverses a region of the well, which contains well fluid layers, pursuant to block 258. The temperature versus depth profile is then allowed to reach steady state, pursuant to block 262. Based on the observed temperature versus depth profile, the depth of at least one well fluid layer interface is determined, pursuant to block 266.

Thus, instead of pumping fluid from a hotter or colder zone and then stopping and measuring the temperature relaxation, the pumping may instead be continuous. The temperature versus depth profile in the loop reaches steady state when the local flow of heat into and out of the loop is balanced. At steady state, there is a discontinuity in the temperature versus depth profile for each point where the loop crosses the boundary between two fluid layers.

The advantages of the steady state test may include one or more of the following, depending on the particular embodiment of the invention. The steady state test allows data to be recorded over a longer period; and the data may be stacked and averaged over time, thereby giving greater temperature resolution and greater sensitivity. This steady state test may possibly be easier to automate than the relaxation test. The steady state test may provide a more reliable identification of the interface depths when there is a non-uniform temperature distribution with depth, such as, for example, in steam flood wells where a hot gas layer may overlay cooler oil and water zones. If there are conduction effects in the loop, which may degrade the DTS measurement, the steady state approach may be less susceptible to this degradation.

Figure 7:
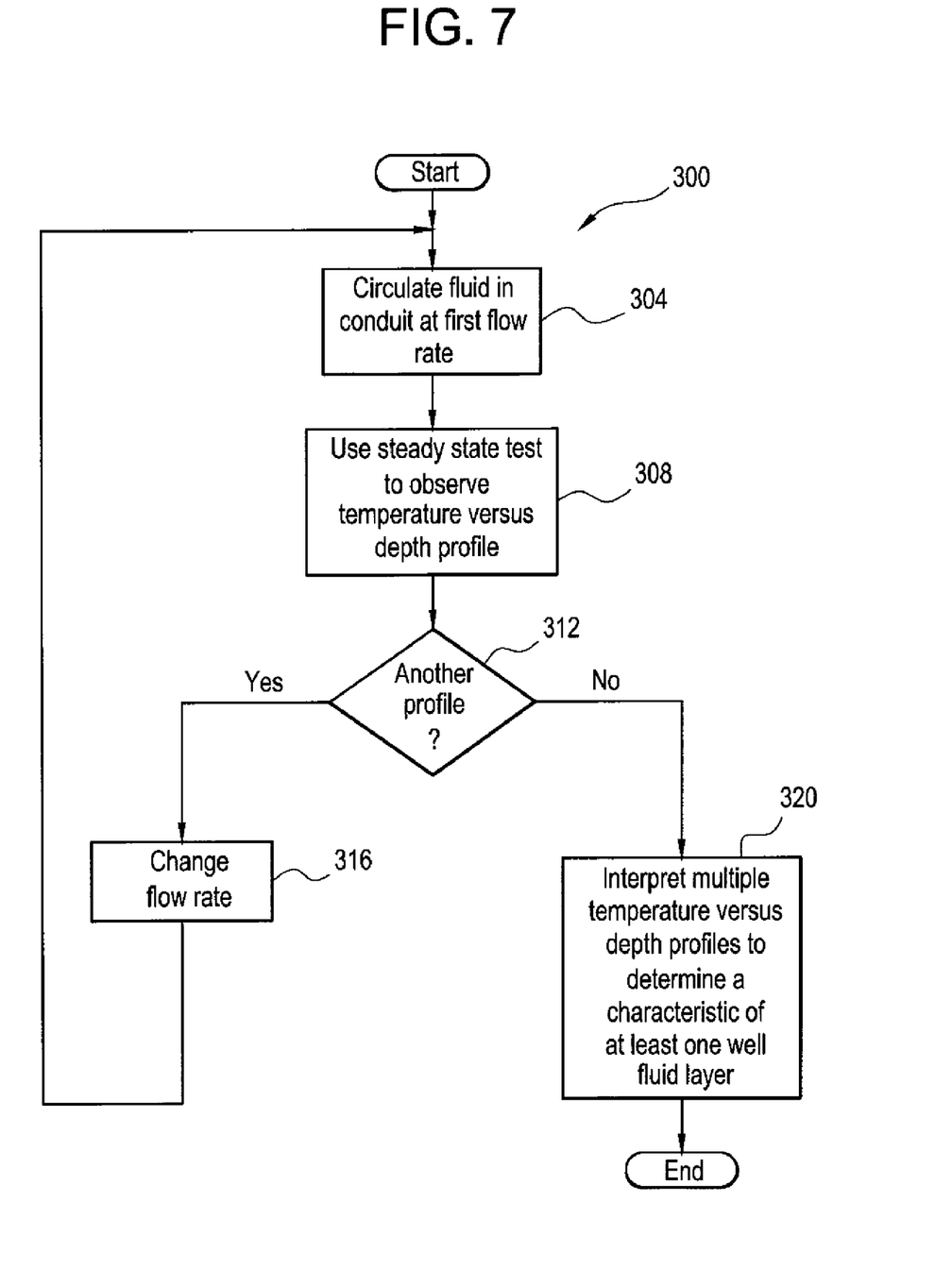
FIG. 7 is a flow diagram depicting a technique to identify a depth of at least one well fluid layer boundary using a combination of distributed temperature sensing and different flow rates according to an embodiment of the invention.

Referring to FIG. 7, variations of the above-described steady state test may be performed in other embodiments of the invention. For example, several steady state tests may be performed, where a different circulation flow rate is used for each test. Thus, pursuant to a technique 300, fluid may be circulated in a conduit at a first flow rate (block 304), and the steady state test may be used to obtain a corresponding temperature versus depth profile, pursuant to block 308. If another profile is desired (diamond 312), the flow rate is changed (block 316) before the steady state test is used again to observe a corresponding temperature versus depth profile, pursuant to block 308. After several temperature versus depth profiles have been obtained, the temperature versus depth profiles may be interpreted (block 320) to determine the depth of at least one well fluid layer interface. The generation of multiple temperature versus depth profiles may provide a better interpretation of the positioning of the well fluid layers and the corresponding interfaces.

Figure 8:
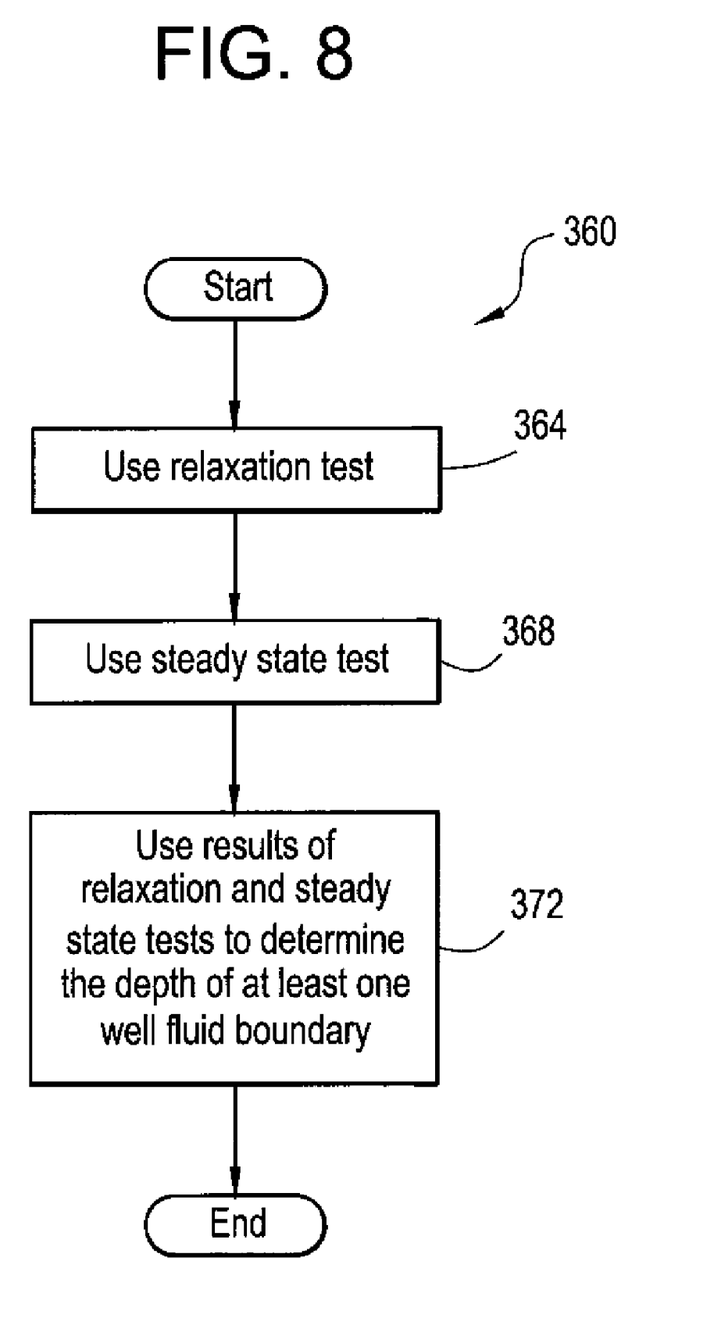
FIG. 8 is a flow diagram depicting a technique to use a combination of relaxation and steady state distributed temperature sensing techniques to identify a depth of at least one well fluid layer boundary according to an embodiment of the invention.

As an example of another embodiment of the invention, referring to FIG. 8, a technique 360 may include using both the relaxation (block 364) and steady state (block 368) tests to determine the depth of at least one well fluid interface. Results of the relaxation and steady state tests may then be combined to identify one or more of the characteristics, pursuant to block 372. Depending on the geometry and the nature of the fluid and materials, the determination of different fluid interfaces may be more sensitive to one test than to the other. Thus, by using the combination of the steady state and relaxation tests, as outlined in FIG. 8, the positioning of the well fluid layers and interfaces may be more accurately determined.

In fields where steam flooding is employed, a layer of fresh water may be produced from condensed saline formation water. Thus, there may be in effect, a fourth fluid layer. Knowledge of the position of this layer may be useful. However, determining the boundaries of the fresh and saline water layers may be more difficult than the determination of the other boundaries because the fresh and saline water have very similar thermal conductivities and thermal capacities. Therefore, the use of a more sensitive technique (such as the technique 300 (FIG. 7), for example) may be able to distinguish the fresh and saline layers and the interface in between.

Figure 9:
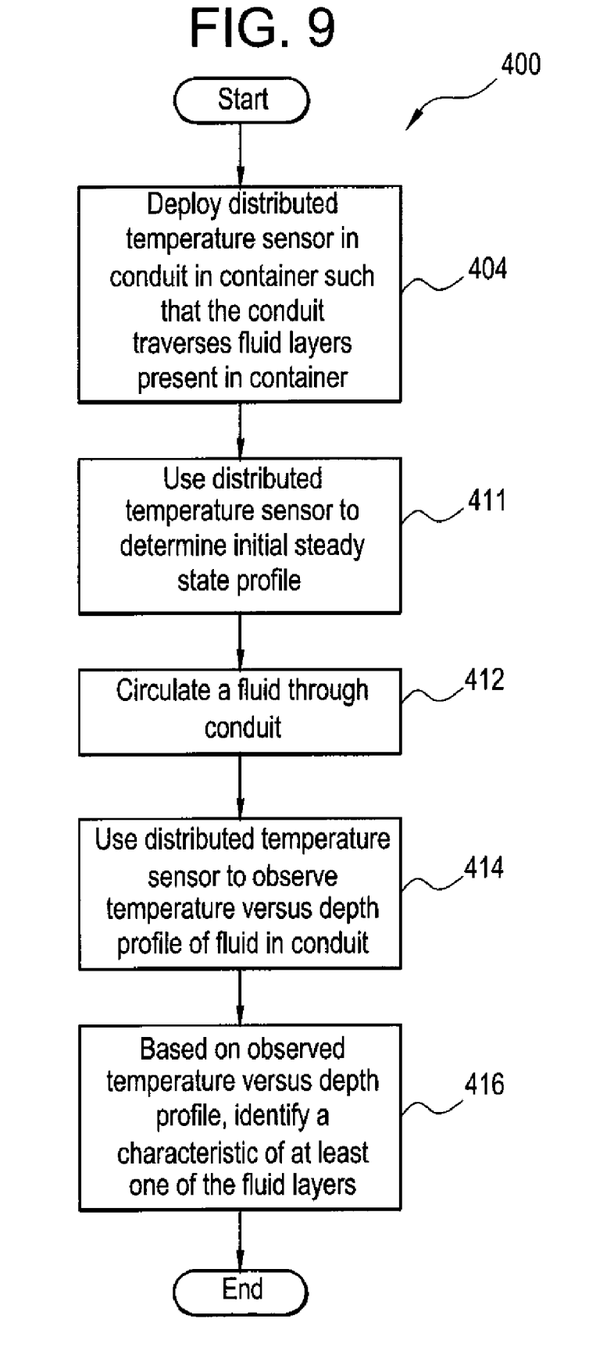
FIG. 9 is a flow diagram depicting a technique to use a distributed temperature sensor to identify a characteristic of at least one fluid layer that is present in a container according to an embodiment of the invention.

Other systems and techniques are contemplated and are within the scope of the appended claims. For example, referring to FIG. 9, a technique 400 in accordance with some embodiments of the invention includes deploying a distributed temperature sensor in a container inside a conduit that extends through fluid layers present in the container, pursuant to block 404. The distributed temperature sensor is used (block 413) to determine the initial steady state profile prior to the circulation of a fluid that is contained in the conduit. The fluid is then communicated (forced through by a pump, for example) through the conduit, pursuant to block 412; and the distributed temperature sensor is used to observe a temperature profile of fluid in the conduit, pursuant to block 414. Thus, the particular profile observed depends on whether the relaxation test, the steady state test or a combination thereof is used. Based on the observed temperature profile, a characteristic of at least one of the fluid layers is identified, pursuant to block 416.

As another variation, in accordance with some embodiments of the invention, the DTS system described herein may be combined with other downhole sensor-based subsystems. In this regard, in accordance with some embodiments of the invention, one or more pressure sensors (as an example) may be disposed downhole in the well to measure pressure(s) of the well fluid layer(s).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method usable with a well, comprising:
   disposing a distributed temperature sensor in a conduit that traverses a region of the well, the region containing at least two different well fluid layers and the distributed temperature sensor indicating a temperature versus depth profile;
   circulating a fluid through the conduit;
   controlling the circulation to cause the temperature versus depth profile to indicate at least one boundary of the well fluid layers; and
   based on the indication, determining the depth of at least one boundary of said at least one boundary.

2. The method of claim 1, wherein the act of controlling the circulation comprises pumping the fluid from the surface of the well using a pump located at the surface.

3. The method of claim 1, wherein the act of controlling the circulation comprises pumping the fluid from a downhole location.

4. The method of claim 1, wherein the act of determining comprises identifying at least one discontinuity in the temperature versus depth profile.

5. The method of claim 1, wherein
   the act of controlling the circulation comprises halting the circulation of the fluid in the region, and
   the temperature versus depth profile is indicative of a relaxation of the temperature versus depth profile while the circulation of the fluid is halted.

6. The method of claim 1, wherein
   the act of controlling the circulation allows the temperature versus depth profile to reach steady state while the fluid is being circulated.

7. The method of claim 1, wherein
   the act of controlling the circulation comprises varying a rate of the circulating; and
   the act of determining comprises observing the temperature versus depth profile for different circulation rates of the fluid.

8. The method of claim 1, wherein the act of determining comprises observing the temperature versus depth profile during a relaxation period in which the fluid is not being circulated and in a second period in which the temperature versus depth profile is in steady state and the fluid is being circulated.

9. A system usable with a well, comprising:
a tubing to traverse a region of the well, the region containing at least two different well fluid layers;
a distributed temperature subsystem comprising a distributed temperature sensor disposed in the tubing to indicate a temperature versus depth profile; and
a pump to circulate a fluid through the tubing,
wherein the circulation of the fluid is controlled to cause the temperature versus depth profile to indicate the boundaries of the fluid layers, and
the distributed temperature subsystem observes the depth of at least one of the boundaries based on the indication from the temperature versus depth profile.

10. The system of claim 9, wherein the pump is located at the surface of the well.

11. The system of claim 9, wherein the pump comprises a pump located downhole in the well.

12. The system of claim 9, wherein the temperature versus depth profile contains at least one discontinuity that identifies the characteristic.

13. The system of claim 9, wherein the pump is adapted to halt the circulation of the fluid in the tubing so that the temperature versus depth profile undergoes a relaxation period while the fluid is halted and indicates the characteristic during the relaxation.

14. The system of claim 9, wherein the pump is adapted to circulate the fluid to allow the temperature versus depth profile to reach steady state.

15. The system of claim 9, wherein the pump is adapted to vary a rate at which the fluid is circulated in the tubing and the subsystem is adapted to obtain multiple temperature versus depth profiles, with each temperature versus depth profile being associated with a different one of the flow rates.

16. The system of claim 15, wherein the subsystem is adapted to combine the multiple temperature versus depth profiles to indicate the depth.

17. The system of claim 9, wherein
the pump is adapted to, in a relaxation test, circulate the fluid through the tubing and then halt the fluid, and in a steady state test continuously circulate the fluid, and
the subsystem is adapted to combine results from the relaxation test and the steady state test to identify the depth.

18. The system of claim 9, wherein the distributed temperature sensor is retrievable from the well.

19. The system of claim 18, wherein the sensor comprises an optical fiber.

20. The system of claim 9, further comprising:
a non DTS-based sensor located in the region.

21. The system of claim 20, wherein the non DTS-based sensor comprises a pressure sensor.

22. A system comprising:
a tubing to traverse a region of a container, the region containing at least two different fluid layers;
a pump to circulate a fluid through the tubing; and
a subsystem comprising a distributed temperature sensor disposed in the tubing to indicate a temperature versus depth profile, the subsystem adapted to observe the temperature versus depth profile in response to the circulation of the fluid such that the temperature versus depth profile indicates a characteristic associated with at least one of the fluid layers.

23. The system of claim 22, wherein
the pump is adapted to circulate the fluid through the tubing and subsequently halt the circulation of fluid, and
the subsystem is adapted to observe relaxation of the temperature versus depth profile while the fluid is halted to generate an indication of the characteristic.

24. The system of claim 22, wherein
the pump is adapted to continuously circulate the fluid through the tubing such that the temperature versus depth profile reaches steady state, and
the subsystem is adapted to in a steady state test generate an indication of the temperature versus depth profile while the fluid is being circulated.

\* \* \* \* \*